United States Patent [19]

Ishida

[11] Patent Number: 4,914,372

[45] Date of Patent: Apr. 3, 1990

[54] SMALL ENGINE FOR HAND-HELD WORK MACHINES

[75] Inventor: Shigetoshi Ishida, Chiba, Japan

[73] Assignee: Tanaka Kogyo Co., Ltd., Chiba, Japan

[21] Appl. No.: 247,043

[22] Filed: Sep. 20, 1988

[51] Int. Cl.[4] ............................ F02P 1/00; H02J 7/00

[52] U.S. Cl. .................................... 320/61; 310/70 A; 322/90

[58] Field of Search ............ 310/70 R, 70 A; 322/89, 322/90, 91, 94, 17; 320/61

[56] References Cited

U.S. PATENT DOCUMENTS 3,009,092 11/1961 Carmichael ...................... 322/17 X 3,864,621 2/1975 Haubner et al. ..................... 322/17

4,404,513 9/1983 Campen ................................ 322/90

4,537,174 8/1985 Nagasawa ..................... 310/70 R X 4,603,664 8/1986 Jackson ........................... 310/153 X

*Primary Examiner*—R. J. Hickey

*Attorney, Agent, or Firm*—Frishauf, Holtz, Goodman & Woodward

[57] ABSTRACT

A small engine suitable for hand-held work machines such as cleavers and chain-saws in which the engine is started by driving a self-starting motor with the electromotive force of a secondary battery and wherein the size and weight of the engine is reduced by eliminating the use of a generator since the secondary battery is charged by utilizing the electromotive force of a magnet in reverse direction that is not normally used for igniting the engine.

4 Claims, 4 Drawing Sheets

SMALL ENGINE FOR HAND-HELD WORK MACHINES

BACKGROUND OF THE INVENTION AND RELATED ART STATEMENT

The present invention relates to improvements of a small engine suitable for hand-held machines such as cleavers and chain saws.

Conventional large engines for work machines are usually started with a self starting motor. Engines of this type are provided with a separate small generator driven by the rotation of the engine for compensating for the power in the battery consumed at the time of starting the engine. However, provision of a generator is extremely inadequate in engines intended for hand-held work machines such as cleavers and chain saws as the size thereof must be reduced by minimizing the weight and volume and ease in handling must be improved.

SUMMARY OF THE INVENTION

In the small engine for hand-held work machines according to the present invention which comprises a magneto for generating AC voltage by the engine rotation, and an ignition mechanism for discharging sparks at the ignition plug for the engine by the voltage of either one of the polarities of the magneto output, the engine is provided with a self-starting motor for starting the engine, a secondary battery for driving the self-starting motor, and a charging mechanism for charging said battery with voltage of the other polarity of the magneto output during engine rotation.

According to one embodiment of the present invention, the charging mechanism comprises a rectifier which is directly connected in between the output terminal of AC voltage of the magneto and either one of the positive or negative terminals of the battery According to another embodiment of the invention, the magneto has a rotor connected to the crankshaft of the engine and a stator including an ignition coil opposed to the rotor. The rotor is fixed with a magnet for generating AC voltage at the ignition coil of the stator for spark discharge and at least one magnet which is positionally deviated in the rotation angle for attachment, and which is intended for generating AC voltage at the ignition coil during the engine strokes other than the compression stroke.

The small engine for hand-held work machines according to the present invention is started by driving self-starting motor with electromotive force of the secondary battery. The charging mechanism charges the battery by effectively utilizing the output voltage of the magneto in the other polarity, that is, the electromotive force of the magneto in reverse direction which is generally not used for igniting the engine while the engine is in rotation. In this manner, electricity of the battery consumed for starting the engine can be compensated while the engine is in rotation without using a power generator. Because of the engine size, the capacity of the self-starting motor for the small engine need not be very large. The battery may also be small in capacity as the charging current is not exceptionally high. It is therefore possible to construct the charging mechanism with, for example, a rectifier which is directly connected in between the output terminal of AC voltage of the magneto and either one of the positive and negative terminals of the battery, to effect charging of the battery with the magneto output without control.

Said magneto usually comprises a rotor connected to the crankshaft of the engine and a stator including an ignition coil opposed to the rotor, and the rotor is fixed at a predetermined position with a magnet which generates AC voltage for spark discharge at the ignition coil of the stator. The magnet induces voltage at the ignition coil by passing across the front of the stator at a suitable timing during the compression stroke of the engine. In order to further secure electromotive force for charging, at least one more magnet may be fixed to the rotor at a position with a rotational angle which allows generation of AC voltage at the ignition coil at a timing other than during the compression stroke of the engine. In this case, the electric power for charging increases with the increase in the number of magnets. Although plural spark discharges occur in one rotation of the crankshaft, the additional magnet(s) is provided at such a position as to induce the voltage at a timing other than the compression stroke of the engine, so that the spark discharge of the additional magnet(s) would not cause ignition in the cylinder and would not affect the engine performance.

It is preferable that the magnet which generates AC voltage for spark discharge at the ignition coil and the additional magnet(s) should be so attached to the rotor that the flux changes caused in the stator by the respective magnets should be in reverse directions with each other while the rotor rotates in one direction. This suppresses inadvertent sparks at the ignition plug at a timing other than during the ignition stroke and at the same time increases the charging current of the battery.

Figure 3:
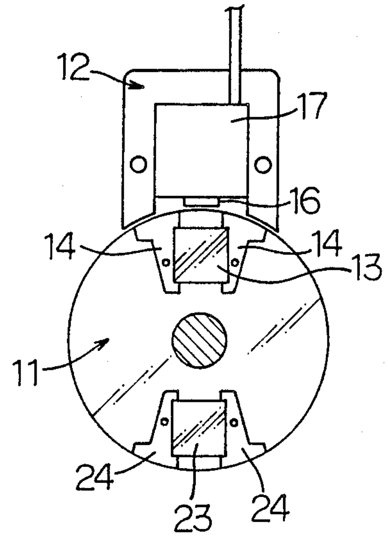
FIG. 3 is an explanatory view to show the construction of the engine magneto according to another embodiment of the invention.

FIG. *3a* through *3d* show the operational waveforms of the primary coil in the embodiment shown in FIG. 3.

FIGS. *3e* through *3h* show the operational waveforms of the primary coil in modified embodiment.

Figure 4:
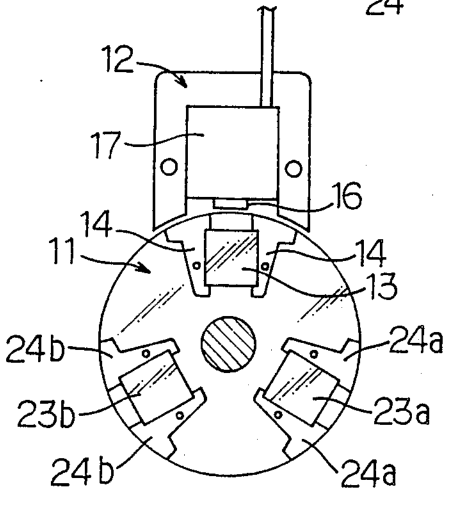

FIG. 4 is an explanatory view to show the construction of the engine magneto according to still another embodiment of the invention.

PREFERRED EMBODIMENTS OF THE INVENTION

A preferred embodiment of a small engine for hand-held work machines will now be described in detail referring to the accompanying drawings.

Figure 1:
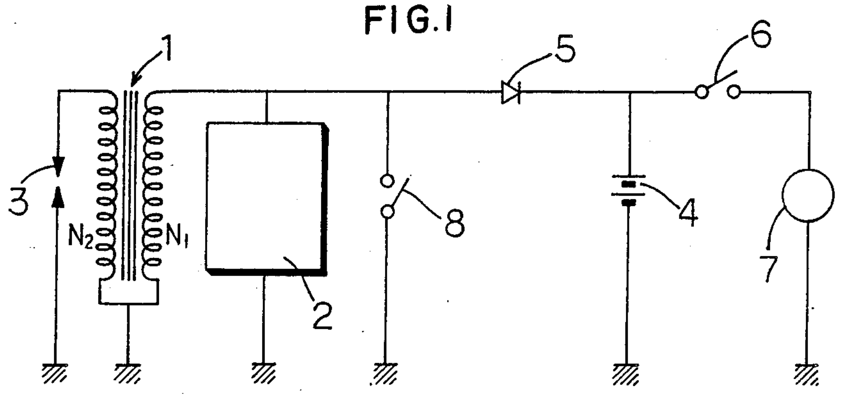
FIG. 1 is a circuit diagram of a preferred embodiment of a small engine for hand-held work machines.

FIG. 1 shows the electric circuit of a small engine for hand-held work machines according to the present invention, in which a magneto 1 generates AC voltage on the primary side $N_1$ of an ignition coil by the rotation of the engine. When the AC voltage is negative, the primary coil $N_1$ is controlled of short-circuiting by an ignitor 2 comprising a transistor ignition circuit and the like connected to the primary coil. As the short-circuit current in the primary coil $N_1$ substantially reaches the peak, primary short-circuit current therein is rapidly cut off by the ignitor 2, whereby a high voltage is induced in a secondary coil $N_2$ of the ignition coil to discharge sparks in an ignition plug 3 connected to the secondary coil $N_2$. Said short-circuit is controlled in the ignitor 2 only for the period when the AC voltage induced in the primary coil $N_1$ is in negative. For the period when the voltage is in positive, current in the ignitor 2 can be led outside. In order to supply the current in the positive period to a battery 4 as a charging current by rectifying the current in non-control manner, a rectifier 5 having the polarity as shown is connected in between the primary coil $N_1$ and the battery 4. The battery 4 may, for example, be a small and sealed type accumulator of lead, nickel or cadmium. A self-starting motor 7 is connected between the terminals via a starter switch 6. An engine switch 8 is connected between the terminals of the ignitor 2 which is to be closed for stopping the engine by short-circuiting the induced power of the magneto 1 to the grounding; otherwise the switch is normally open.

As the starter switch 6 is closed while the engine switch 8 is in the open state, the current from the battery 4 is supplied to the self-starting motor 7 only for the while the switch is closed, whereby the self-starting motor is rotated to actuate the engine. In this case, since the switch 8 is open, AC voltage generated at the primary coil $N_1$ of the magneto is applied on the ignitor 2. While the voltage is in negative period, the primary short-curcuit current passing in the primary coil $N_1$ is rapidly cut off by the action of the ignitor 2 when the current is substantially at its peak, to induce high voltage in the secondary coil $N_2$ of the ignition coil. This causes spark discharge at the ignition plug 3 connected to the secondary coil $N_2$. As the engine is started in the manner as described above, the positive current of the AC voltage generated at the primary coil $N_1$ of the magneto 1 which is not utilized in the ignition stroke passes through the rectifier 5 to flow into the battery 4 as the charging current. Since the charging current is not very large as mentioned earlier, noncontrol type charging with the rectifier alone is effected, minimizing the number of components necessary for charging.

Figure 2:
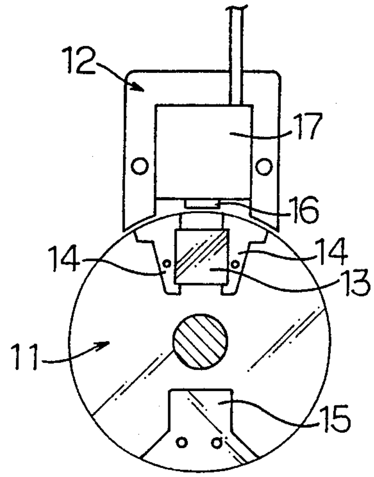
FIG. 2 is an explanatory view to show one construction of the engine magneto. FIGS. *2a* through *2d* show the operational waveforms of the primary coil in the embodiment shown in FIG. 2.

FIG. 2 is an explanatory view to show the typical construction of a magneto. In FIG. 2, reference numeral 11 denotes a rotor of the magneto and 12 a stator. The rotor 11 is connected to the engine crankshaft and rotates once per rotation of the crankshaft. A magnet 13 interposed between a magnetic strip 14 each on both sides is fixed to the rotor 11. A counter-weight 15 is fixed at a position symmetrical with respect to the rotational axis of the magnet 13 to keep the rotor balanced. The stator 12 comprises an iron core 16 in letter E and an ignition coil ($N_1$, $N_2$) 17 wound about the core, and is opposed to the rotor 11. As the rotor 11 rotates with the rotation of the engine, the magnet 13 which is fixed to the rotor at a predetermined position passes across the front of the stator including the opposed ignition coil at an appropriate timing during the compression stroke of the engine to induce voltage at the ignition coil 17. The induced voltage, while it is in the positive period, is used for charging the battery 4 via the rectifier 5 shown in FIG. 1. The induced voltage, while it is in the negative period, is used for discharging sparks at the ignition plug 3 by the ignitor 2.

Figure 2A:
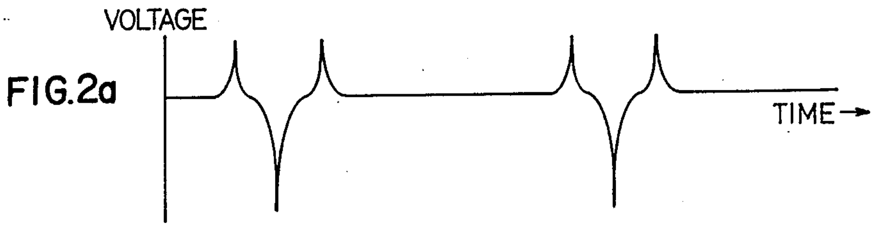
Figure 2B:
Figure 2C:
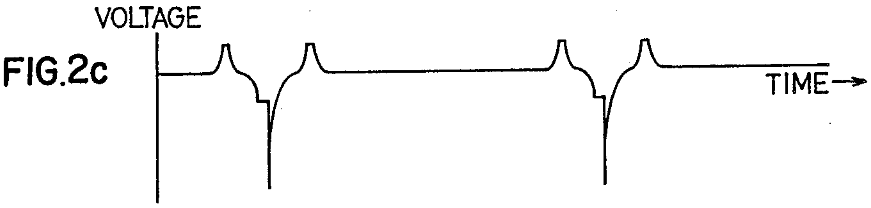
Figure 2D:

FIGS. 2*a* through 2*d* show the waveforms of the essential parts in operation as mentioned above for the period of two rotations of the rotor 11, or for two cycles. FIG. 2*a* shows the waveform of the AC current under no load induced at the primary coil $N_1$ of the ignition coil. FIG. 2*b* is the waveforms of the current of the primary coil $N_1$ in short-circuit. FIGS. 2*c* and 2*d* show the voltage and current waveforms respectively of the primary coil $N_1$ in the circuit connection as shown in FIG. 1. The voltage induced at the primary coil $N_1$ which is in the negative period is utilized in igniting the plug, while the short-circuit current which is in the negative period is cut off at its substantial peak, as shown in FIG. 2*d*. The current which is in the positive period flows into the battery 4 via a diode 5 as charging current.

FIG. 3 shows another embodiment wherein an additional magnet 23 and a magnetic strip 24 are fixed on the rotor at a rotational angle which allows generation of AC current at the ignition coil at timings other than during the compression stroke of the engine for securing electromotive force for charging.

Figure 3A:
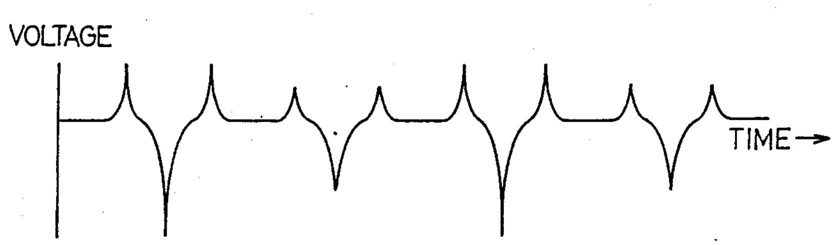
Figure 3B:
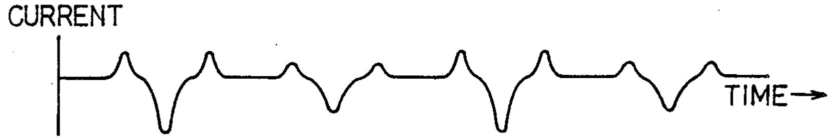

When the magnetic polarities of the magnets 13 and 23 are in alignment, magnetic flux changes are caused by the magnets 13 and 23 in the stator 12 in the same direction as the direction the rotor 11 .rotates. In this case, no-load voltage is induced at the primary coil $N_1$, as shown in FIG. 3*a*. Likewise in FIGS. 2*a* through 2*d*, FIGS. 3*a* through 3*d* show the waveforms of the rotor for two rotations (2 cycles). FIG. 3*b* shows the waveform of the short-circuit current passing in the primary coil $N_1$ when the coil is short-circuited.

Figure 3C:
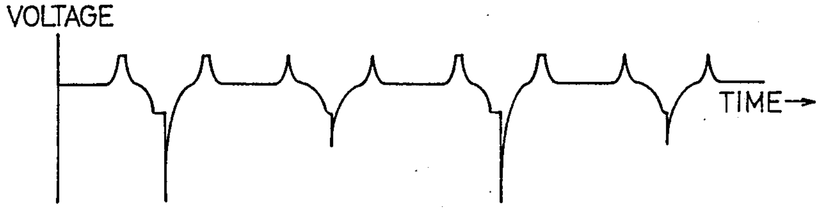
Figure 3D:
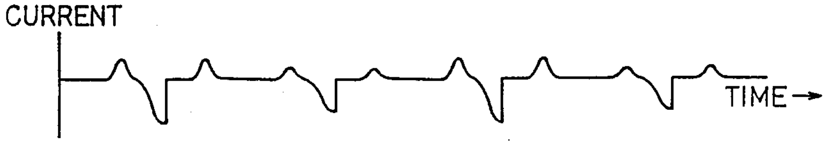

In the circuit connection shown in FIG. 1, the voltage/current waveforms are obtained as shown in FIGS. 3*c* and 3*d*. Theoretically, charging waveform appears 4 times (which is two folds of the case shown in FIG. 2) during the positive period for one rotation of the rotor, increasing the charging current by ca. 2 folds by simple calculation. It is noted, however, that if the magnets 13 and 23 are identical in intensity, then sparks occur at a position directly opposite the position of ignition. When the engine is in operation, sparks at the opposite position are in no way a problem. At the time of starting the engine (at low speed rotation) on the other hand, the sparks may cause abnormal combustion within the cylinder. When the sparks at the opposite plug are suppressed by using a magnet 23 which is weaker in magnetization than the magnet 13, the voltage waveform of the magnet 23 shows a slightly lower value than that of the magnet 13, as shown in FIGS. 3*a* through 3*d*, achieving a current which is ca. 1.5 times the case as shown in FIG. 2.

Figure 3E:
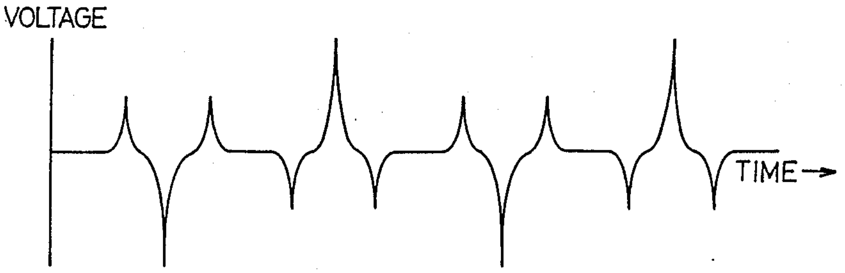
Figure 3F:
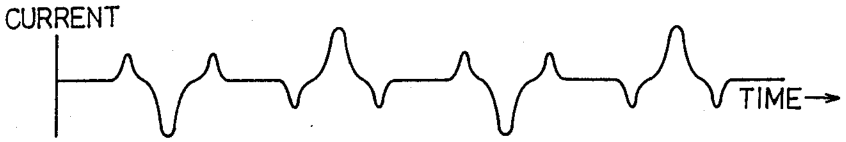
Figure 3G:
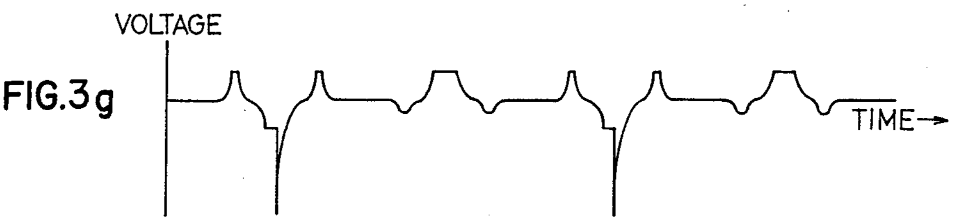
Figure 3H:
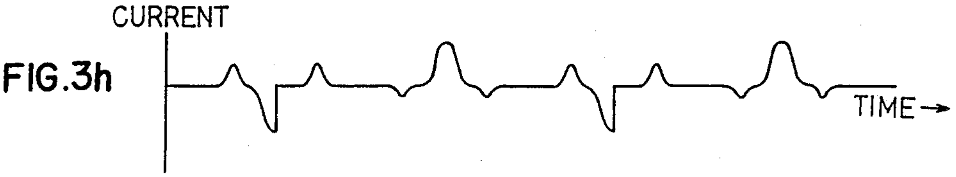

When the magnetic polarity of the magnet 13 is in the direction opposite to the polarity of the magnet 23, magnetic flux changes in opposite directions are caused in the stator 12 by the magnets 13 and 23, resulting in the waveforms as shown in FIGS. 3*e* through 3*h*. In other words, no-load voltage induced at the primary coil $N_1$ assumes a waveform as shown in FIG. 3*e*, and the short-circuit current as in FIG. 3*f*.

When the magnet 23 is thus magnetized in the opposite direction, the voltage peak in the negative period induced by the magnet 23 would not be sufficient for causing sparks at the plug 3. On the other hand, the positive voltage induced by the magnet 23 increases to provide charging current which is higher than when the magnets 13 and 23 are magnetized in one direction, as is clearly shown by the voltage waveform in FIG. 3*g* and the current waveform in FIG. 3*h* with the circuit connection as shown in FIG. 1.

The embodiment shown in FIG. 4 is constructed with plural additional magnets and magnetic strips (23*a*, 24*a*, 23*b*, 24*b*).

In the case of embodiments shown in FIGS. 3 and 4, the electric power for charging increases in proportion to the increase in the number of these magnets. Plural spark discharges also occur during one rotation of the crankshaft. It is noted, however, that the additional magnets 23, 23*a* and 23*b* are provided at such positions that they would induce voltage at timings other than during the compression stroke of the engine. By designing the magnetic field at an intensity which would not cause inadvertent sparks at the plug during the starting operation of the engine with lower speed rotation, spark discharges by the additional magnets 23, 23*a* and 23*b* would not cause ignition in the cylinder and thus would not affect the engine performance.

Thus, by providing additional magnets 23, 23*a* and 23*b* at suitable positions on the rotor 11, it is possible to increase the capacity of battery charging without affecting the engine performance.

As is stated in the foregoing, the present invention engine supplies electricity to the battery while the engine is in rotation for the amount consumed by the self-starting motor without providing a separate generator for battery charging, and is therefore highly practical as a small and lightweight engine for hand-held work machines.

What is claimed is:

1. A small engine for hand-held work machines, comprising:

a magnetic which generates AC voltages by the rotation of the engine;

an ignition mechanism which causes spark discharge at an ignition plug for the engine with a first voltage of either positive or negative polarity of the magneto output;

a self-starting motor for starting the engine;

a secondary battery for driving the self-starting motor; and a charging mechanism for charging said secondary battery with a second voltage of the other of said positive or negative polarity of said magneto during rotation of the engine;

said magneto comprising a rotor mounted so as to be driven by rotation of said engine and a starter which includes an ignition coil means opposed to said rotor;

said rotor including a first magnet fixed thereto for generating said AC voltage at said ignition coil means of said stator;

coil means including a primary coil in which said AC voltage is induced when said first magnet sweeps past said primary coil during the rotation of said rotor, and a secondary coil electromagnetically coupled to said primary coil and electrically connected to said ignition plug;

said ignition mechanism including a transistorized ignitor connector to said primary coil to control a short circuit of said primary coil for a period when said first AC voltage is induced in said primary coil; and said charging mechanism including means for supplying said second AC voltage to said secondary battery.

2. The small engine of claim 1, wherein said charging mechanism further comprises a rectifier directly coupled between said primary coil and either of a positive or a negative terminal of said battery.

3. The small engine of claim 1, wherein:

said rotor further includes at least one additional magnet fixed thereto for generating an AC voltage at said primary coil at a timing other than during a compression stroke of the engine, said additional magnet being deviated in rotation angle from said first magnet.

4. The small engine of claim 3, wherein said first magnet for generating an AC voltage at the ignition coil means of the stator for spark discharge and said at least one additional magnet are fixed to said rotor such that each magnet causes flux changes in the stator directions opposite to each other when said rotor rotates in one direction.

* * * * *

US004914372B1

REEXAMINATION CERTIFICATE (1736th)

United States Patent [19]

[11] B1 4,914,372

Ishida

[45] Certificate Issued Jun. 30, 1992

[54] SMALL ENGINE FOR HAND-HELD WORK MACHINE

[75] Inventor: Shigetoshi Ishida, Chiba, Japan

[73] Assignee: Tanaka Kogyo Co., Ltd., Narashino, Japan

Reexamination Request:
No. 90/002,323, Apr. 18, 1991

Reexamination Certificate for:
Patent No.: 4,914,372
Issued: Apr. 3, 1990
Appl. No.: 247,043
Filed: Sep. 20, 1988

[51] Int. Cl.$^5$ ............................ F02P 1/00; H02J 7/00
[52] U.S. Cl. .................................. 320/61; 310/70 A; 322/90
[58] Field of Search ....................... 322/89, 90, 91, 94; 310/70 R, 70 A; 320/61

[56] References Cited

FOREIGN PATENT DOCUMENTS 82297 12/1963 European Pat. Off. .
2211050 7/1974 European Pat. Off. .
2509103 9/1975 European Pat. Off. .
1567925 5/1980 European Pat. Off. .
0043891 1/1982 European Pat. Off. .
0049101 4/1982 European Pat. Off. .
59-103871 7/1984 Japan .

OTHER PUBLICATIONS

Japanese Society of Mechanical Engineers "Internal Combustion Engine" vol. 1, Jun. 1956 (3 pages of translation).
Shinio, et al. "Knowledge and Characteristics of Spark Plug" Aug. 1984 (2 pages of translation).
Gima "Electric Ignition Device for Internal Combustion Engine", Oct. 1979 (4 pages and 1 sheet of drawing translation).

*Primary Examiner*—Robert J. Hickey

[57] ABSTRACT

A small engine suitable for hand-held work machines such as cleavers and chain-saws in which the engine is started by driving a self-starting motor with the electromotive force of a secondary battery and wherein the size and weight of the engine is reduced by eliminating the use of a generator since the secondary battery is charged by utilizing the electromotive force of a magnet in reverse direction that is not normally used for igniting the engine.

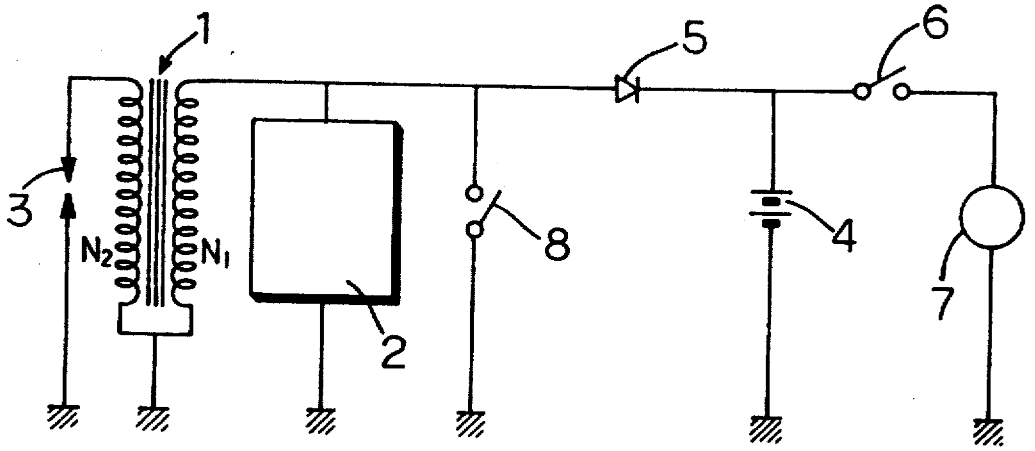

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 4 are cancelled.

Claim 1 is determined to be patentable as amended.

Claim 2, dependent on an amended claim, is determined to be patentable.

New claims 5, 6 and 7 are added and determined to be patentable.

1. A small engine for hand-held machines, comprising:

a [magnetic] *magneto* which generates *an* AC [voltages] *voltage output* by the rotation of the engine;

an ignition mechanism which causes spark discharge at an ignition plug for the engine with a first *AC* voltage of either positive or negative polarity of the magneto output;

a self-starting motor for starting the engine;

a secondary battery for driving the self-starting motor; and a charging mechanism for charging said secondary battery with a second *AC* voltage of the other of said positive or negative polarity of said magneto *output* during rotation of the engine;

said magneto comprising a rotor mounted so as to be driven by rotation of said engine and a [starter] *stator* which includes an ignition coil means opposed to said rotor;

said rotor including a first magnet fixed thereto for generating said AC voltage *output* at said ignition coil means of said stator[;] *and at least a second magnet fixed thereto for generating said AC voltage output at a primary coil at a timing other than during a compression stroke of the engine, said second magnet being deviated in rotation angle from said first magnet, wherein said first magnet for generating said AC voltage output at the ignition coil means of the stator for spark discharge and said at least a second magnet are fixed to said rotor such that each magnet causes flux changes in the stator directions opposite to each other when said rotor rotates in one direction;* coil means including [a] *said* primary coil in which said AC voltage *output* is induced when *each of* said first [magnet] *and second magnets* sweeps past said primary coil during [the] rotation of said rotor, and a secondary coil electromagnetically coupled to said primary coil and electrically connected to said ignition plug;

said ignition mechanism including a transistorized ignitor [connector] *connected* to said primary coil to control a short circuit of said primary coil for a period when said first AC voltage is induced in said primary coil; and said charging mechanism including means for supplying said second AC voltage to said secondary battery.

*5. In a small engine for hand-held work machines, including a magneto which generates an AC voltage output by the rotation of the engine, an ignition mechanism which causes spark discharge at an ignition plug for the engine with a first AC voltage of either positive or negative polarity of said AC voltage output generated by said magneto, a self-starting motor for starting the engine, a secondary battery for driving the self-starting motor, and a charging mechanism for charging said secondary battery with a second AC voltage of the other of said positive or negative polarity of said magneto voltage output during rotation of the engine, the improvement comprising:*

*said magneto having rotor means mounted so as to be driven by rotation of said engine and stator means which includes ignition coil means opposied to said rotor means;*

*said rotor means including magnet means fixed thereto for generating said AC voltage output at said ignition coil means of said stator means;*

*said ignition coil means including a primary coil in which said AC voltage output is induced when said magnet means sweeps past said primary coil during rotation of said rotor means, and a secondary coil electromagnetically coupled to said primary coil and electrically connected to said ignition plug;*

*said ignition mechanism including a transistorized ignitor connected to said primary coil to control a short circuit of said primary coil for a period when said first AC voltage is induced in said primary coil;*

*said charging mechanism including means for supplying said second AC voltage to said secondary battery;*

*said magnet means comprising first magnetic pole means and second magnetic pole means which are bipolar magnetic poles having opposite polarity for inducing voltage peaks having opposite polarities with respect to an ignition peak when said rotor means rotates in one direction, said first magnetic pole means being fixed to said rotor means for generating said AC voltage output at the primary coil for spark discharge and said second magnetic pole means being fixed to said rotor means for generating said AC voltage output at said primary coil at a timing other than during a compression stroke of said engine, said first and second magnetic pole means being deviated in rotation angle from each other.*

*6. The small engine according to claim 5, wherein said charging mechanism further comprises a rectifier directly coupled between said primary coil and either of a positive or a negative terminal of said secondary battery.*

*7. The small engine according to claim 5, wherein said second magnetic pole means comprises a plurality of bipolar magnetic poles fixed to said rotor means at such positions that each of said bipolar magnetic poles induces an AC voltage output at said primary coil at an individual timing other than said compression stroke of the engine, said bipolar magnetic poles being deviated in rotation angle from each other.*

* * * * *